(12) United States Patent
Morley, Jr.

(10) Patent No.: US 9,747,474 B2
(45) Date of Patent: *Aug. 29, 2017

(54) CARD READER DEVICE AND METHOD OF USE

(76) Inventor: Robert E. Morley, Jr., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,979

(22) Filed: Aug. 15, 2012

(65) Prior Publication Data

US 2012/0305645 A1    Dec. 6, 2012

Related U.S. Application Data

(63) Continuation of application No. 12/932,544, filed on Feb. 26, 2011, which is a continuation of application
(Continued)

(51) Int. Cl.
*G06K 19/00* (2006.01)
*G06K 7/08* (2006.01)
*H04M 1/725* (2006.01)

(52) U.S. Cl.
CPC ........ *G06K 7/083* (2013.01); *H04M 1/72527* (2013.01); *H04M 2250/14* (2013.01)

(58) Field of Classification Search
USPC ...................................... 235/435, 439, 449
See application file for complete search history.

(56) References Cited

U.S. PATENT DOCUMENTS

| 4,500,751 A * | 2/1985 | Darland ............... H04M 11/066 379/93.17 |
| 4,845,740 A | 7/1989 | Tokuyama et al. |

(Continued)

FOREIGN PATENT DOCUMENTS

| JP | 30008761 B | 0/0000 |
| JP | H05-110718 | 0/0000 |

(Continued)

OTHER PUBLICATIONS

Padilla, "Turning your mobile into a magnetic stripe reader", http://www.gae.ucm.es/~padilla/extrawork/mobilesoundtrack.html, Accessed by the Wayback Machine on Sep. 24, 2004.*
(Continued)

*Primary Examiner* — Matthew Mikels
(74) *Attorney, Agent, or Firm* — Polster Lieder Woodruff & Lucchesi, L.C.

(57) ABSTRACT

In one embodiment, a card reader device includes: a read head configured to generate a signal indicative of data stored on a magnetic stripe of a card, an output plug, adapted to be inserted into a headset jack of a mobile host device, configured to communicate an output signal indicative of data stored on the magnetic stripe to a microphone input of the headset jack of the mobile host device; and circuitry configured to set the amplitude, which includes attenuation by at least a resistor, of a signal communicating said data included in the signal indicative of data stored on the magnetic stripe generated by the read head resulting in the output signal indicative of data stored on the magnetic stripe. In one embodiment, the circuitry includes decoding circuitry configured to decode the signal indicative of the data stored on the magnetic stripe.

27 Claims, 7 Drawing Sheets

Related U.S. Application Data

No. 12/657,792, filed on Jan. 27, 2010, now Pat. No. 7,896,248, which is a continuation-in-part of application No. 12/456,134, filed on Jun. 10, 2009, now Pat. No. 7,810,729.

(56) References Cited

U.S. PATENT DOCUMENTS

| | | | | |
|---|---|---|---|---|
| 5,097,708 | A | * | 3/1992 | Kobayashi ............. 73/593 |
| 5,204,513 | A | | 4/1993 | Steele |
| 5,371,692 | A | | 12/1994 | Draeger et al. |
| 5,764,742 | A | | 6/1998 | Howard et al. |
| 5,850,599 | A | | 12/1998 | Seiderman |
| 6,006,109 | A | | 12/1999 | Shin |
| 6,129,277 | A | | 10/2000 | Grant et al. |
| 6,481,623 | B1 | | 11/2002 | Grant et al. |
| 6,579,728 | B2 | | 6/2003 | Grant et al. |
| 7,252,232 | B2 | | 8/2007 | Fernandes et al. |
| 7,309,012 | B2 | * | 12/2007 | von Mueller et al. ....... 235/449 |
| 7,324,836 | B2 | | 1/2008 | Steenstra et al. |
| 7,409,234 | B2 | | 8/2008 | Glezerman |
| 7,810,729 | B2 | * | 10/2010 | Morley, Jr. ............. 235/449 |
| 7,896,248 | B2 | * | 3/2011 | Morley, Jr. ............. 235/449 |
| 7,918,394 | B1 | * | 4/2011 | Morley, Jr. ............. 235/449 |
| 8,254,592 | B2 | | 8/2012 | Sander et al. |
| 8,281,998 | B2 | | 10/2012 | Tang et al. |
| 8,376,223 | B2 | | 2/2013 | Woronec |
| 8,584,946 | B2 | | 11/2013 | Morley, Jr. |
| 2001/0053228 | A1 | | 12/2001 | Jonens |
| 2002/0002507 | A1 | | 1/2002 | Hatakeyama |
| 2002/0030871 | A1 | * | 3/2002 | Anderson ........... H04B 1/385 398/132 |
| 2003/0144040 | A1 | | 7/2003 | Liu et al. |
| 2004/0012875 | A1 | | 1/2004 | Wood |
| 2004/0041911 | A1 | | 3/2004 | Odagiri et al. |
| 2004/0087339 | A1 | | 5/2004 | Goldthwaite et al. |
| 2004/0093496 | A1 | | 5/2004 | Colnot |
| 2004/0104268 | A1 | | 6/2004 | Bailey |
| 2004/0204074 | A1 | | 10/2004 | Desai |
| 2005/0247787 | A1 | * | 11/2005 | Von Mueller et al. ....... 235/449 |
| 2006/0094481 | A1 | | 5/2006 | Gullickson |
| 2006/0223580 | A1 | | 10/2006 | Antonio et al. |
| 2007/0067833 | A1 | | 3/2007 | Colnot |
| 2007/0250623 | A1 | | 10/2007 | Hickey et al. |
| 2008/0059370 | A1 | | 3/2008 | Sada et al. |
| 2008/0059375 | A1 | * | 3/2008 | Abifaker ............. G06Q 20/04 705/44 |
| 2010/0243732 | A1 | | 9/2010 | Wallner |
| 2010/0260341 | A1 | * | 10/2010 | Sander et al. ............ 381/1 |
| 2011/0084140 | A1 | | 4/2011 | Wen |
| 2011/0174879 | A1 | * | 7/2011 | Morley, Jr. ............. 235/449 |
| 2012/0168505 | A1 | | 7/2012 | Sather et al. |
| 2012/0305645 | A1 | | 12/2012 | Morley, Jr. |
| 2013/0130743 | A1 | | 5/2013 | Lin |
| 2014/0076964 | A1 | | 3/2014 | Morley, Jr. |

FOREIGN PATENT DOCUMENTS

| | | |
|---|---|---|
| JP | H05-110718 | 4/1993 |
| JP | 30008764 B | 12/1994 |
| KR | 1020020002838 A | 1/2002 |
| KR | 1020020002838 A | 3/2003 |
| KR | 101017525 B1 | 2/2011 |
| WO | WO 2010/097711 A2 | 9/2010 |
| WO | WO 2010/111130 A2 | 9/2010 |
| WO | 2010/144136 A1 | 12/2010 |
| WO | 2011/093998 A1 | 8/2011 |

OTHER PUBLICATIONS

Padilla, "Magnetic stripe reader circuit", http://www.gae.ucm.es/~padilla/extrawork/magamp.htm, Accessed by the Wayback Machine on Mar. 1, 2000.*

Sébastien Bourdeauducq, Reading Magnetic Cards (Almost) for Free 1-2 (Jan. 26, 2009), available at http://lekernel.net/blog/2009/01/reading-magnetic-cards-almost-for-free ("Lekernel").*

Luis Padilla Visdómine, Turning Your Mobile Into a Magnetic Stripe Reader 1-4 (2007), available at http://classic-web.archive.org/web/20041027001715/http://www.gae.ucm.es/~padilla/extrawork/mobilesoundtrack.html ("Padilla").*

PTAB Decision for IPR2014-00312, Rendered Jul. 7, 2015.*

PCT International Preliminary Report on Patentability, PCT Application PCT/US10/01660, ISA/US, Alexandria, Virginia, dated Nov. 27, 2012 (seven pages).

PCT International Preliminary Report on Patentability, PCT Application PCT/US2011/000137, ISA/US, Alexandria, Virginia, dated Mar. 3, 2011 (six pages).

"Right of Appeal Notice," U.S. Appl. No. 95/001,618, U.S., Alexandria Virginia, dated Jul. 17, 2012 (nineteen pages).

"Decision on Appeal," Appeal 2013-009801, U.S. Appl. No. 95/001,618, Patent Trial and Appeals Board, U.S., Alexandria Virginia, dated Mar. 31, 2014 (thirty-four pages).

Patent Owner's Request for Rehearing, Appeal 2013-009801, U.S. Appl. No. 95/001,618, U.S., Alexandria Virginia, dated Apr. 28, 2014 (one hundred thirty-one pages).

"Right of Appeal Notice," U.S. Appl. No. 95/001,620, U.S., Alexandria Virginia, dated Jun. 11, 2012 (twenty-six pages).

"Decision on Appeal," Appeal 2013-010534, U.S. Appl. No. 95/001,620, Patent Trial and Appeals Board, U.S., Alexandria Virginia, dated Mar. 28, 2014 (forty-one pages).

"Patent Owner's Response", Appeal 2013-010534, U.S. Appl. No. 95/001,620, U.S., Alexandria Virginia, dated May 28, 2014 (twenty-one pages).

Plaintiffs' Original Complaint, Civil Action No. 4:14-cv-00172, United States District Court for the Eastern District of Missouri, Eastern Division, filed Jan. 30, 2014 (thirty-three pages).

Defendants' Answer to Plaintiffs' Original Complaint, Civil Action No. 4:14-cv-00172-CDP, United States District Court for the Eastern District of Missouri, Eastern Division, filed Apr. 24, 2014 (forty-seven pages).

Defendants First Amended Answer to Complaint, Affirmative Defenses, and First Amended Counterclaims Against Plaintiffs, *Square, Inc. and James McKelvey. Square, Inc. and James McKelvey, Plaintiffs and Counterclaim Defendants*, vs. REM Holdings 3, LLC, a Missouri LLC, Defendant and Counterclaim Plaintiff. Civil Action No. 4:10-cv-2243 SNLJ. United States District Court for the Eastern District of Missouri, Eastern Division. Filed May 24, 2011.

Plaintiffs' Answer to Defendant's First Amended Counterclaims Against Plaintiffs *Square, Inc. and James McKelvey, Square, Inc. and James McKelvey, Plaintiffs and Counterclaim Defendants*, vs. *REM Holdings 3, LLC*, a Missouri LLC, Defendant and Counterclaim Plaintiff. Civil Action No. 4:10-cv-2243 SNLJ. United States District Court for the Eastern District of Missouri, Eastern Division. Filed Jun. 10, 2011.

Memorandum in Support of Defendant'S Rule 12(b)(6) Motion to Dismiss Plaintiff'S Claims of Inequitable Conduct, *Square, Inc. and James McKelvey, Plaintiffs* v. *REM Holdings 3, LLC, a Missouri LLC*, Defendant. Civil Action No. 4:10-cv-2243 SNLJ. United States District Court for the Eastern District of Missouri, Eastern Division. Filed Jun. 30, 2011.

"Institution of Inter Partes Review of U.S. Pat. No. 8,584,946 B2," IPR2014-00312, Patent Trial and Appeal Board, U.S. Patent and Trademark Office, Alexandria Virginia, Jul. 10, 2014 (twenty-eight pages).

"Patent Owner Preliminary Response in Inter Partes Review of U.S. Pat. No. 8,584,946 B2," IPR2014-00312, Patent Trial and Appeal Board, U.S. Patent and Trademark Office, Alexandria Virginia, Apr. 16, 2014 (sixty-eight pages).

Kenneth G. Mages, "Apparatus for & Method of Secure ATM Debit Card & Credit Card Payment Transactions via Mobile Phone," U.S. Appl. No. 61/151,459, U.S. Patent and Trademark Office, Alexandria Virginia, Feb. 10, 2009 (five pages).

Sebastien Bourdeauducq, "Reading Magnetic Cards (Almost) for Free," posted on Jan. 26, 2009 at http://lekernel.net/blog/?p=12 (two pages).

(56) References Cited

OTHER PUBLICATIONS

"MSR500EX (Mini123EX) Portable Magnetic Stripe Card Reader," by Tyner ("Tyner"), posted on Apr. 27, 2007 at http://www.tynercom/megnetic/msr500ex.htm, 3 pages.
Luis Padilla Visdomine, "Turning Your Mobile into a Magnetic Stripe Reader," at http://www.gae.ucm.es/~padilla/extrawork/mobilesoundtrack.html first version: Aug. 30, 2004, last updated Dec. 6, 2009, 2 pages.
L. Padilla, "Magnetic Stripe Reader Circuit," at http://www.gae.ucm.es/~padilla/extrawork/magamp.html, first version: Jan. 28, 1997, last updated Dec. 5, 2009, 7 pages.
Luis Padilla Visdomine, "The Simplest Magnetic Stripe Reader," at http://www.gae.ucm.es/~padilla/extrawork/soundtrack.html, Aug. 30, 2004, 3 pages.
George Wallner, "Acoustically Coupled Card Reader," U.S. Appl. No. 61/163,296, filed Mar. 25, 2009 (8 pages).
Definition of "DC-coupled," http://www.sweetwatercom/expertcenter/glossanfit—DC-coupled, Aug. 29, 2011 (1 page).
"Computer Microphones," http://web.archive.org/web/20090303083201/http://hobby-hour.com/electronics/com . . . , Aug. 14, 2011 (2 pages).
"Sound Card External Connectors", Gateway Support Document, http://support.gateway.com/s/tutorials/Tu_949612.shtml. Aug. 10, 2011 (2 pages).
Definition of "Game Port", Wikipedia. http://en.wikipedia.org/wiki/Game_port, Aug. 28, 2011 (5 pages).
"Siemens MC60 cell phone," http://siemphones.blogspot.com/2008/siemens-mc60-review.html, Sep. 2, 2008, 2 pages.
http://www.infosyncworld.com/reviews/cell-phones/Ig-rumor2/10184.html "LG Rumor 2 review" Philip Berne May 16, 2009, 3 pages.
U.S. District Judge Stephen N. Limbaugh, Jr., "Memorandum and Order," United States District Court, Eastern District of Missouri, Eastern Division, Consolidated Cases Nos. 4:14cv172 and 4:10cv2243 SNLJ, St. Louis, MO, Apr. 22, 2016 (thirty-nine pages).
U.S. District Judge Stephen N. Limbaugh, Jr., "Memorandum and Order," United States District Court, Eastern District of Missouri, Eastern Division, Consolidated Cases Nos. 4:14cv172 and 4:10cv2243 SNLJ, St. Louis, MO, Oct. 30, 2015 (twelve pages).
"Decision Granting Ex Pane Examination," U.S. Appl. No. 90/013,463, U.S., Alexandria, Virginia, Jul. 29, 2015 (twenty-five pages).
Termination of Ex Parte Examination and Statement of Patentability and/or Confirmation, U.S. Appl. No. 90/013,463, U.S., Alexandria, Virginia, Nov. 3, 2015 (eight pages).
"Decision Granting Ex Pane Examination," U.S. Appl. No. 90/013,690, U.S., Alexandria, Virginia, Mar. 30, 2016 (seventeen pages).
"Final Written Decision," IPR2014-00312, Patent Trial and Appeal Board, U.S., Alexandria, Virginia, Jul. 7, 2015 (thirty-nine pages).
"Decision on Request for Rehearing," Appeal 2013-009801, Patent Trial and Appeals Board, U.S., Alexandria, Virginia, Jul. 8, 2015 (eleven pages).
"Order Remanding Inter Partes Reexamination Under 37 C.F.R. Sect. 41.77(d) to the Examiner," Appeal 2013-010534, Patent Trial and Appeals Board, U.S., Alexandria, Virginia, Nov. 10, 2014 (five pages).
"Patent Owner's Response Under 37 C.F.R. Sect. 41.77," Appeal 2013-010534, Patent Trial and Appeals Board, U.S., Alexandria, Virginia, May 28, 2014 (forty-one pages).
"Determination Under 37 C.F.R. Sect. 41.77(d)," Reexamination Control U.S., Alexandria, Virginia, Jun. 5, 2015 (seventeen pages).
"Patent Owner's Comments on Examiner Determination and Cancellation of Claim 17 Pursuant to 37 C.F.R. Sect. 11.63(a)," U.S. Appl. No. 95/001,620, U.S., Alexandria, Virginia, Jul. 1, 2015 (thirty-eight pages).
"Patent Owner's Reply to Third Party Requestor's Comments Pursuant to 37 C.F.R. Sect. 41.77(e)," U.S. Appl. No. 95/001,620, U.S., Alexandria, Virginia, Aug. 6, 2015 (thirty-one pages).
"Patent Owner's Notice of Appeal to United States Court of Appeals for the Federal Circuit" U.S. Appl. No. 35/001,618, U.S., Alexandria, Virginia, Sep. 8, 2015, (6 pages).
"Form 5. Petition for Review or Notice of Appeal of an Order or Decision of an Agency, Board, Commission, Office or Bureau", Jan. 22, 2016, (6 pages).
"Patent Owner's Notice of Cross-Appeal", U.S. Pat. No. 8,584,946, U.S., Alexandria, Virginia, Feb. 4, 2016, (5 pages).
"Order Granting Square Dismissal", Patent Trial and Appeal Board in No. IPR2014-00312, U.S., Alexandria, Virginia, Jun. 30, 2016, (3 pages).
"Notice of Intervention by the United States Patent and Trademark Office", U.S. Court of Appeals for the Federal Circuit, Appeal No. 2016-1651, Jul. 13, 2016, (2 pages).
"Appellant's Statement of Issues and Appellant's Designated Appendix Designations", U.S. Court of Appeals for the Federal Circuit, Appeal No. 2016-1095, Nov. 3, 2015, (5 pages).
"Corrected Unopposed Motion to Dismiss Its Appeal", U.S. Court of Appeals for the Federal Circuit, Appeal No. 2016-1651, Aug. 26, 2016, (4 pages).
"Motion to Dismiss Appeal, in Part, for Lack of Jurisdiction", U.S. Court of Appeals for the Federal Circuit, The U.S. Patent Trial and Appeal Board, Appeal No. 2016-1095, Dec. 7, 2015, (8 pages).
"Opposition to Square's Motion to Dismiss Appeal, In Part, For Lack of Jurisdiction", U.S. Court of Appeals for the Federal Circuit, Appeal No. 2016-1095, Dec. 21, 2015, (48 pages).
"Order Granting Motion to Terminate Appeal" U.S. Court of Appeals for the Federal Circuit, Appeal No. 2016-1651, Aug. 31, 2016, (2 pages).
"Reply in Support of Motion to Dismiss Appeal, In Part, For Lack of Jurisdiction", U.S. Court of Appeals for the Federal Circuit, Appeal No. 2016-1095, Dec. 31, 2015, (8 pages).
"Order Denying Motion to Terminate Appeal", U.S. Court of Appeals for the Federal Circuit, the U.S. Patent Trial and Appeal Board, Appeal No. 2016-1095, Jan. 15, 2016, (2 pages).
"Appellants Opening Brief", U.S. Court of Appeals for the Federal Circuit, the U.S. Patent Trial and Appeal Board, Appeal No. 2016-1095, Feb. 16, 2016, (162 pages).
"Order Granting Motion to Dismiss Appeal and Square", U.S. Court of Appeals for the Federal Circuit, Appeal No. 2016-1651, Jun. 30, 2016, (3 pages).
"Notice of Intervention by the U.S.", U.S. Court of Appeals for the Federal Circuit, Appeal No. 2016-1095, Mar. 29, 2016, (3 pages).
"Answering Brief of Petitioner-Appellee Square, Inc", U.S. Court of Appeals for the Federal Circuit, Appeal No. 2016-1095, Mar. 31, 2016, (75 pages).
"Brief for Intervenor—Director of the USPTO", U.S. Court of Appeals for the Federal Circuit, Appeal No. 2016-1095, May 16, 2016 (31 pages).
"Appellees Motion to Withdraw As a Party", U.S. Court of Appeals for the Federal Circuit, Appeal No. 2016-1095, Jun. 28, 2016, (4 pages).
"Order Granting Motion to Dismiss Party", U.S. Court of Appeals for the Federal Circuit, Appeal No. 2016-1095, Jun. 30, 2016, (4 pages).
"Unopoosed Motion to Dismiss Its Appeal", U.S. Court of Appeals for the Federal Circuit, the U.S. Patent Trial and Appeal Board, U.S. Appl. No. 98/001,618, Aug. 26, 2016, (1 page).
"Order Granting Motion to Terminate Appeal", U.S. Court of Appeals for the Federal Circuit, Appeal No. 2016-1095, Aug. 29, 2016, (2 pages).
"General Docket Report", Court of Appeals Docket #16/1095, U.S. Court of Appeals for the Federal Circuit, (7 pages).
"General Docket Report", Court of Appeals Docket #: 16/1650, U.S. Court of Appeals for the Federal Circuit, (5 pages).
"General Docket Report", Court of Appeals Docket #: 16/1651, U.S. Court of Appeals for the Federal Circuit, (5 pages).
U.S. District Judge Stephen N. Limbaugh, Jr., "Memorandum and Order Re Motion for Summary Judgment", U.S. District Court Eastern District of Missouri, Consolidated Case Nos. 4:10-cv-172 and 4:10-cv-2243-SNLJ, St. Louis, Missouri, Apr. 22, 2016, (39 pages).

(56) References Cited

OTHER PUBLICATIONS

"Amendment E (accompanying an RCE)" Response to Notice of Allowance dated Mar. 24, 2016, U.S. Appl. No. 13/585,979, U.S., Alexandria, Virginia, dated Jun. 24, 2016 (22 pages).
Non-Final Office Action, U.S. Appl. No. 13/585,979, U.S., Alexandria, Virginia, dated Sep. 22, 2016, (16 pages).
Non-Final Office Action, U.S. Appl. No. 14/444,608, U.S., Alexandria, Virginia, dated Oct. 12, 2016, (13 pages).
"Ex Parte Reexam Certificate", U.S. Pat. No. 8,584,946 C1, Morley, Jr., U.S., Alexandria, Virginia, Issued Jan. 12, 2017, (2 pages).
"Reexam Non-Final Action" Re Application No. 90013690, U.S., Alexandria, Virginia, dated Aug. 19, 2016, (35 pages).
"Reexam Petition Decision Dismissed" Re Application No. 90013690, U.S., Alexandria, Virginia, dated Apr. 13, 2016, (9 pages).
"Receipt of Petition in a Reexam" Re Application No. 90013690, U.S., Alexandria, Virginia, dated Apr. 6, 2016, (5 pages).
"Receipt of Petition in a Reexam 2" Re Application No. 90013690, U.S., Alexandria, dated Virginia, Feb. 29, 2016, (15 pages).
"Receipt of Orig. Ex Parte Request by Third Party" Re Application No. 90013690, U.S., Alexandria, Virginia, Feb. 9, 2016, (46 pages).
"Decision Appeal", Reexamination Control No. 951001,620, Patent Trial and Appeal Board, U.S., Alexandria, Virginia, Feb. 27, 2017 (66 pages).
US District Judge Stephen N. Limbaugh, Jr., "Memorandum and Order," United States District Court, Eastern District Df Missouri, Eastern Division, Consolidated Cases Nos. 4:14cv172 and 4:10cv2243 SNLJ, St. Louis, MO, Apr. 22, 2016 (39 pages).
U.S. District Judge Stephen N. Limbaugh, Jr., "Memorandum and Order," United States District Court, Eastern District Df Missouri, Eastern Division, Consolidated Cases Nos. 4:14cv172 and 4:10cv2243 SNLJ, St. Louis, MO, Oct. 30, 2015 (12 pages).
"Decision Granting Ex Parte Examination," Reexamination Control No. 90/013,463, U.S. Patent and Trademark Office, Alexandria, Virginia, Jul. 29, 2015 (25 pages).
Termination of Ex Parte Examination and Statement of Reasons for Patentability and/or Confirmation, U.S. Appl. No. 90/013,463, U.S., Alexandria, Virginia, Nov. 3, 2015 (8 pages).
"Decision Granting Ex Parte Reexamination," U.S. Appl. No. 90/013,690, U.S., Alexandria, Virginia, Mar. 30, 2016 (17 pages).
"Final Written Decision," IPR2014-00312, Patent Trial and Appeal Board, U.S., Alexandria, Virginia, Jul. 7, 2015 (39 pages).
"Decision on Request for Rehearing," Appeal 2013-009801, Patent Trial and Appeal Board, U.S., Alexandria, Virginia, Jul. 8, 2015 (11 pages).
"Order Remanding Inter Partes Reexamination Under 37 C.F.R. Sect. 41.77(d) to the Examiner," Appeal 2013-010534, Patent Trial and Appeal Board, U.S., Alexandria, Virginia, Nov. 10, 2014 (5 pages).
"Patent Owner's Response Under 37 C.F.R. Sect. 41.77," Appeal 2013-010534, Patent Trial and Appeal Board, U.S., Alexandria, Virginia, May 28, 2014 (41 pages).
"Determination Under 37 C.F.R. Sect. 41.77(d)," U.S. Appl. No. 95/001,620, U.S., Alexandria, Virginia, Jun. 5, 2015 (17 pages).
"Patent Owner's Comments on Examiner Determination and Cancellation of Claim 17 Pursuant to 37 C.F.R. Sect. 11.63(a)," U.S. Appl. No. 95/001,620, U.S., Alexandria, Virginia, Jul. 1, 2015 (38 pages).
"Patent Owner's Reply to Third Party Requester's Comments Pursuant to 37 C.F.R. Sect. 41.77(e)," U.S. Appl. No. 95/001,620, U.S., Alexandria, Virginia, Aug. 6, 2015 (31 pages).

US District Judge Stephen N. Limbaugh, Jr., "Order of Dismissal", U.S. District Court Eastern District, Case: 4:10-cv-02243-SNLJ, St. Louis, Missouri, Jun. 17, 2016, (2 pages).
PCT International Preliminary Report on Patentability, PCT Application PCT/US2010/01660, ISA/US, Alexandria, Virginia, dated Nov. 27, 2012 (5 pages).
PCT International Preliminary Report on Patentability, PCT Application PCT/US2011/000137 ISA/US, Alexandria, Virginia, dated Mar. 30, 2011 (4 pages).
"Right of Appeal Notice," U.S. Appl. No. 95/001,618, U.S., Alexandria, Virginia, dated Jul. 17, 2012, 19 pages).
"Decision on Appeal," Appeal 2013-009801, U.S. Appl. No. 95/001,618 Patent Trial and Appeal Board, U.S., Alexandria, Virginia, dated Mar. 31, 2014 (34 pages).
"Patent Owner's Request for Rehearing," Appeal 2013-009801, U.S. Appl. No. 95/001,618, U.S., Alexandria, Virginia, dated Apr. 28, 2014 (131 pages).
"Right of Appeal Notice," U.S. Appl. No. 95/001,620, U.S., Alexandria, Virginia, dated Jun. 11, 2012 (26 pages).
"Decision on Appeal," Appeal 2013-010534, U.S. Appl. No. 95/001,620, Patent Trial and Appeal Board, U.S., Alexandria, Virginia, dated Mar. 28, 2014 (41 pages).
"Patent Owner's Response", Appeal 2013-010534, U.S. Appl. No. 95/001,620, U.S., Alexandria, Virginia, dated May 28, 2014 (21 pages).
"Decision Institution of Inter Partes Review of U.S. Pat. No. 8,584,946 B2," IPR2014-00312, Patent Trial and Appeal Board, U.S., Alexandria, Virginia, Jul. 10, 2014 (28 pages).
"Patent Owner Preliminary Response in Inter Partes Review of U.S. Pat. No. 8,584,946 B2," IPR2014-00312, Patent Trial and Appeal Board, U.S., Alexandria, Virginia, Apr. 16, 2014 (68 pages).
Kenneth G. Mages, "Apparatus for & Method of Secure ATM Debit Card & Credit Card Payment Transaction via Mobile Phone," U.S. Appl. No. 61/151,489, U.S., Alexandria, Virginia, Feb. 10, 2009 (5 pages).
"MSR500EX (Mini 123EX) Portable Magnetic Stripe Card Reader, by Tyner (Tyner")", posted on Apr. 27, 2007 at http: www.tyner. com/magnetic/msr500exhtm (3 pages).
Luis Padilla Visdomine, "Turning Your Mobile into a Magnetic Stripe reader," at http:www.gae.ucm.es/~padilla/ extrawork/ mobilesoundtrack.html first version: Aug. 30, 2004, last updated Dec. 6, 2009, (2 pages).
Louis Padilla Visdomine, "Magnetic Stripe Reader Circuit," at http://www.gae.ucm.es/~padilla/extrawork/magamp.html, first version: Jan. 28, 1997, last updated Dec. 5, 2009 (7 pages).
Louis Padilla Visdomine, "The Simplest Magnetic Stripe Reader," at http://www.gae.ucm.es/~padilla/extrawork/sountrack.html, Aug. 30, 2004 (3 pages).
L. Padilla, "The Simplest Magnetic Stripe Reader," http://gae.ucm. es/~padilla/extrawork/soundtrack.html, First version Jan. 27, 2003, last updated Dec. 10, 2009 (5 pages).
"LG Rumor 2 review", Philip Berne, http://www.infosyncworld. com/reviews/cell-phones/Ig-rumor2/10184.html, May 16, 2009 (3 pages).
Plaintiffs' Original Complaint, Civil Action No. 4:14-cv-00172, United States District Court for the Eastern District of Missouri, Eastern Division, filed Jan. 30, 2014 (33 pages).
Defendants' Answer to Plaintiffs' Original Complaint, Civil Action No. 4:14-cv-00172-CDP, United States District Court for the Eastern District of Missouri, Eastern Division, filed Apr. 24, 2014 (47 pages).

\* cited by examiner

CARD READER DEVICE AND METHOD OF USE

CROSS-REFERENCE TO RELATED APPLICATIONS

This application is a continuation of U.S. patent application Ser. No. 12/932,544, filed Feb. 26, 2011, which is a continuation of U.S. patent application Ser. No. 12/657,792, filed Jan. 27, 2010, now U.S. Pat. No. 7,896,248, which is a continuation-in-part of U.S. patent application Ser. No. 12/456,134, filed on Jun. 10, 2009, now U.S. Pat. No. 7,810,729, with the complete disclosure of each of these applications being hereby incorporated by reference.

TECHNICAL FIELD

The present disclosure relates generally to credit card reader devices that are configured to be inserted into a headset jack of a mobile host device, and their use.

BACKGROUND

This disclosure relates to a card reader device for use with a host device for reading a magnetic stripe card and more particularly to a portable card reader device which senses the magnetically recorded information stored on a magnetic stripe card and conveys this sensed information via an analog waveform to a host device for further processing.

Plastic cards having a magnetic stripe embedded on one side of the card are prevalent in every day commerce. These cards are used in various transactions such as to pay for purchases by using a credit card, a debit card, or a gasoline charge card. A charge card or a debit card may also be used to transact business with a bank through use of an automated teller machine (ATM). The magnetic stripe card is capable of storing data by modifying the magnetism of magnetic particles embedded in the stripe. The data stored on the magnetic stripe may be sensed or read by swiping the stripe past a read head. The analog waveform obtained by sensing the magnetic stripe must undergo a process known as decoding to obtain the digital information stored in the magnetic stripe of the card. Conventional magnetic stripe card readers are comprised of both relatively simple sensing components as well as the more costly and complex decoding and communication components.

It is typical in a magnetic stripe card to locate the magnetic stripe 0.223 inches from an edge of the card with the stripe being 0.375 inches wide. The magnetic stripe contains up to three tracks of digital data with each track being 0.110 inches wide. Tracks one and three are typically recorded at 210 bits per inch, while track two typically has a recording density of 75 bits per inch. Each track can either contain 7-bit alphanumeric characters, or 5-bit numeric characters. Track one standards were created by the airlines industry, the International Air Transport Association. Track one can contain information reserved for the bank that issued the card and magnetically encoded data like the primary account number, the user's name, a country code, an expiration date for the card, and 79 characters of discretionary data, all mixed in with separators and other specialized computer characters. The second track, the track most commonly used, is in a format defined by the American Bankers Association. The second track can contain the primary account number, the country code, the card's expiration date, 40 characters of discretionary data, and separator characters. The third track is in a format called THRIFT and was originally intended for use with ATMs. Unlike tracks one and two, which are read only tracks, the third track was intended for read and write applications. However, for the most part, the third track is hardly ever used. Further, the International Organization for Standardization (ISO), an international-standard setting body, has a set of standards for describing the physical dimensions and recording technique on identification cards which are known as ISO 7810 and 7811.

Magnetic stripe cards having these standard specifications can typically be read by point-of-sale devices at a merchant's location. When the card is swiped through an electronic card reader at the checkout counter at a merchant's store, the reader will usually use its built-in modem to dial the number of a company that handles credit authentication requests. Once the account is verified an approval signal will be sent back to the merchant to complete a transaction.

Although magnetic stripe cards are universally used by merchants there is no way for an individual to take advantage of the card to receive a payment from another individual (who is not a merchant) by swiping the card through a simple reader attached to his cell phone or another device which can connect to the Internet. For example, one individual may owe another person money for a debt, but one way to pay the debt is to provide cash or a check. It would be convenient to be able to use a credit card or a debit card to pay off the debt. In addition, it is advantageous for an individual to make payment to another individual or merchant by swiping his magnetic stripe card through a reader connected to a cell phone or other device. However, there is presently no way for an individual to send payment to an individual or merchant through the use of a magnetic stripe card by using a simple magnetic stripe card reader connected to a cell phone or other device.

Therefore, it would be desirable to have a simple card reader device that would allow an individual to receive or send payments through the use of a magnetic stripe card. It is also desirable to provide a simple portable card reader device that can be connected to a host device with the portable card reader device providing the decoding function for the sensed magnetic stripe information with the host device acting as a point-of-sale device. The host device can have an application programmed therein to receive decoded data from the portable card reader device or to decode data contained on a magnetic stripe to submit the card data to a company or a third party that handles credit authentication requests.

DESCRIPTION OF EXAMPLE EMBODIMENTS

1. Overview

Figure 1:
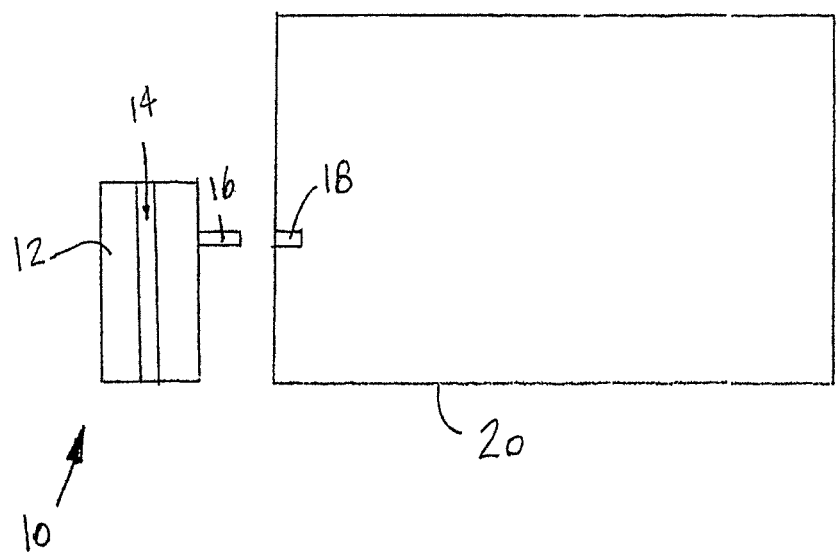
FIG. 1 is a side perspective view of a card reader device constructed according to the present disclosure.

Apparatus and method embodiments related to a card reader device are disclosed and claimed herein.

One embodiment includes a card reader device, comprising: a housing including a slot; a read head, positioned in relation to the slot, that generates an analog, non-digitized signal indicative of data stored on a magnetic stripe of a card when passed by the read head by swiping the card in the slot; an integrated circuit that receives an analog, non-digitized input signal representative of the analog, non-digitized signal indicative of data stored on the magnetic stripe, that decodes the analog, non-digitized input signal representative of the signal indicative of the data stored on the magnetic stripe to determine decoded data including an account number, and that generates an output signal that is a modulated signal conveying information including the account number; and a standard tip, ring(s), sleeve output plug, adapted to be inserted into a standard headset jack of a mobile host device, that communicates the output signal to the microphone input of the standard headset jack of the mobile host device into which the standard headset jack of the mobile host device is inserted; wherein the standard tip, ring(s), sleeve output plug extends from the housing and the housing holds the integrated circuit and the read head; and wherein the card reader device provides all electrical connections with the mobile host device via the standard IRS (tip, ring(s), sleeve) output plug.

One embodiment includes a method, comprising: generating, by a read head of a card reader device in response to a magnetic stripe of a card being swiped in a slot of a housing of the card reader device causing the magnetic stripe to be passed by the read head, an analog, non-digitized signal indicative of data stored on the magnetic stripe; decoding, by an integrated circuit of the card reader device, a received analog, non-digitized representation of the analog, non-digitized signal indicative of data stored on the magnetic stripe to produce decoded data including an account number; generating, by the integrated circuit, an output signal that is a modulated signal conveying information including the account number; providing the output signal to a microphone input of a standard headset jack of a mobile host device in which a standard tip, ring(s), sleeve output plug of the card reader device is currently inserted; wherein the tip, ring(s), sleeve output plug extends from the housing and the housing holds the integrated circuit and the read head; and wherein the card reader device provides all electrical connections with the mobile host device via the standard TRS (tip, ring(s), sleeve) output plug.

2. Description

In one form of the present disclosure, a card reader device for reading a card having data stored on a magnetic stripe incorporated into the card the card reader device comprises a read head for passing a magnetic stripe of a card by to read data stored on a magnetic stripe and for producing a signal indicative of data stored on a magnetic stripe, a signal setting device for setting an amplitude of the signal indicative of data stored on a magnetic stripe, and an output plug adapted to be inserted into a headset jack associated with a host for providing the signal indicative of data stored on a magnetic stripe to a host device, wherein application software resident on the host device directs the processor of the host device to decode the signal provided to the headset jack to produce the digital data stored on the card.

In another form of the present disclosure, a card reader device for reading a card having data stored on a magnetic stripe incorporated into the card the card reader device comprises a read head for passing a magnetic stripe of a card by to read data stored on a magnetic stripe and for producing a signal indicative of data stored on a magnetic stripe, a signal setting device for setting an amplitude of the signal indicative of data stored on a magnetic stripe, an integrated circuit device connected to the signal setting device and the read head for receiving the signal indicative of data stored on a magnetic stripe, and an output plug adapted to be inserted into a headset jack associated with a host for providing the signal indicative of data stored on a magnetic stripe to a host device, wherein application software resident on the host device directs the processor of the host device to decode the signal provided to the headset jack to produce the digital data stored on the card.

In yet another form of the present disclosure, a card reader device for reading a card having data stored on a magnetic stripe incorporated into the card the device comprises a read head for passing a magnetic stripe of a card by to read data stored on a magnetic stripe and for producing a signal indicative of data stored on a magnetic stripe, a signal setting device for setting an amplitude of the signal indicative of data stored on a magnetic stripe, an integrated circuit device connected to the signal setting device and the read head for receiving the signal indicative of data stored on a magnetic stripe, and an output plug connected to the integrated circuit device adapted to be inserted into an input associated with a host device for providing the signal indicative of data stored on a magnetic stripe to a host device and adapted to receive power from the host device by an audio output associated with the host device.

In light of the foregoing comments, it will be recognized that the present disclosure provides a card reader device comprised of a very simple external device to be used in conjunction with a host device having application software provided to perform the decoding function.

The present disclosure provides a card reader device that can read and decode data stored on a magnetic stripe card by sensing the recorded data waveform and transmitting the data waveform to a host device where it is decoded with built in circuitry and application software provided in the host device.

The present disclosure also provides a card reader device that can read one or more tracks of data stored on a magnetic stripe card.

The present disclosure is directed to a card reader device that is of simple construction and design and which can be easily employed with highly reliable results.

The present disclosure is related to a card reader device that can be easily carried, transported, or stored.

The present disclosure is directed to a card reader device that can read and decode data stored on a magnetic stripe card by sensing the recorded data waveform and transmitting the data waveform to a host device where built in circuitry and application software provided in the host device receives the data waveform and authenticates the card.

The present disclosure further provides a card reader device that may be constructed in various shapes, designs, or forms.

The present disclosure is directed to a card reader device that incorporates an integrated circuit device that senses and collects a fingerprint associated with the magnetic stripe of the card.

The present disclosure also provides a card reader device that can operate with existing magnetic stripe cards without having to retrofit or change existing magnetic stripe cards.

The present disclosure is further related to a card reader device that can be powered by a host device through the use of an available headset jack to receive power from one or both of the audio channels.

Referring now to the drawings, wherein like numbers refer to like items, number 10 identifies a preferred embodiment of a card reader device constructed according to the present disclosure. With reference now to FIG. 1, the card reader device 10 is shown to comprise a housing 12 having a slot 14 and an output jack 16 extending out from the housing 12. The jack 16 is adapted to be inserted into a socket 18 such as a microphone input or a line in audio input of a cell phone 20. It is also possible and contemplated that the jack 16 may be inserted into a socket associated with other devices such as an iPod touch, a personal digital assistant (PDA), or a device that has WiFi (wireless fidelity) connectivity. The jack 16 may be a TRS (tip, ring, sleeve) connector also known as an audio jack, phone plug, jack plug, stereo plug, mini-jack, or mini-stereo audio connector. The jack 16 may be formed of different sizes such as miniaturized versions that are 3.5 mm or 2.5 mm. It is also possible and contemplated that the jack 16 may be retractable within the housing 12.

The slot 14 is wide enough and deep enough to accept a card having a magnetic stripe. In particular, the slot 14 is deep enough that the magnetic stripe will fit within the slot 14. The slot 14 also has a length that is less than the length of the card to be inserted into the slot 14. However, it is also possible and contemplated that the slot 14 may have other lengths if desired, for a given application. The housing 12 may take on different shapes and sizes, as will be discussed further herein.

Figure 2:
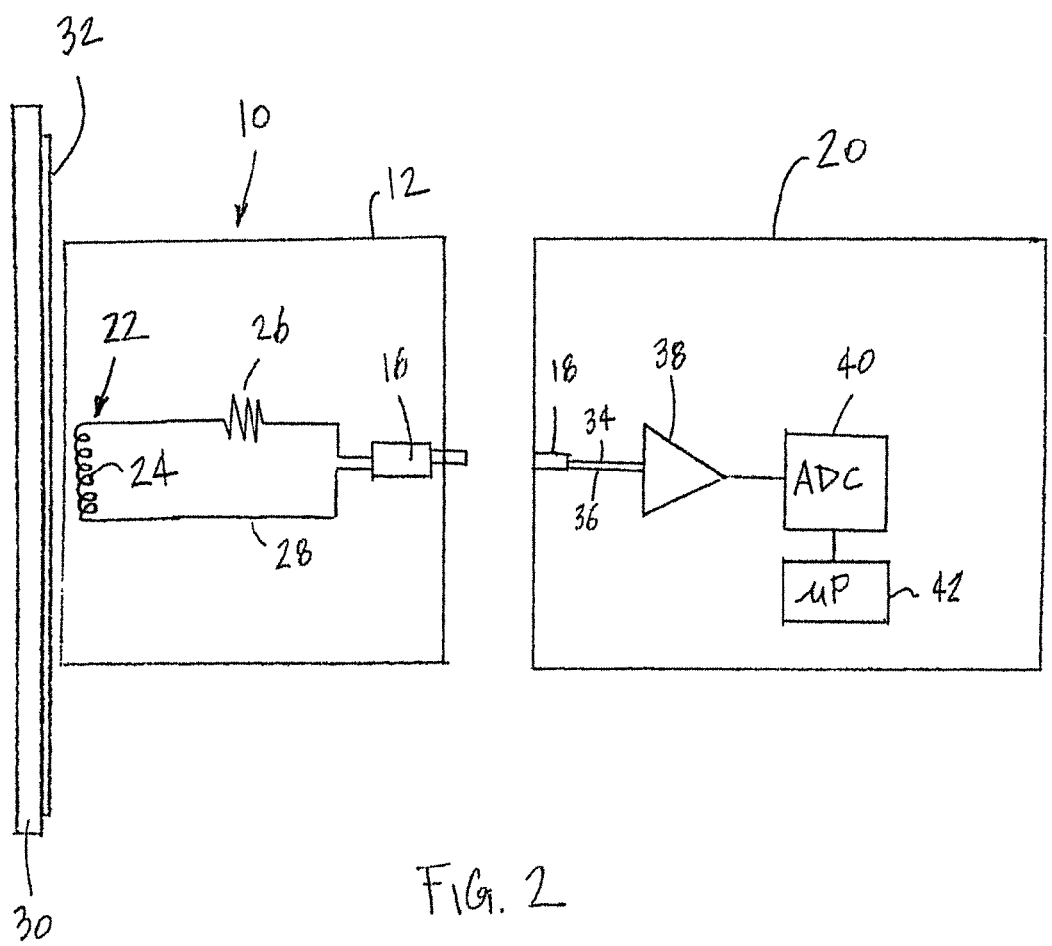
FIG. 2 is a schematic diagram of a card reader device constructed according to the present disclosure.

FIG. 2 illustrates a schematic diagram of the card reader device 10. The card reader device 10 comprises a read head 22, such as an inductive pickup head, having a coil 24 connected to a signal amplitude setting device 26 such as a resistor which is connected to the jack 16. A lead 28 connects the jack 16 to the coil 24 to complete the circuit. A card 30, such as a credit card, has a magnetic stripe 32 associated with the card 30. As has been previously discussed, the magnetic stripe 32 may have three tracks with each of the tracks containing data. The card reader device 10 is capable of reading one track, usually track two, when the device 10 is connected to the microphone input of the cell phone 20. As the magnetic stripe 32 of the card 30 is passed by the read head 22 the read head 22 reads data or information stored in the magnetic stripe 32. Although not shown, the card 30 is inserted into the slot 14 in the housing 12 and the card 30 is swiped or passed by the read head 22. Data stored in the magnetic stripe 32 may be in the form of magnetic transitions as described in the ISO 7811 standards. As the card 30 moves past the read head 22, magnetic transitions representing data induce a voltage in the coil 24. A voltage signal or waveform produced by the coil 24 is provided to the resistor 26 with the resistor setting the amplitude of the waveform. This waveform is sent via the jack 16 into the microphone input socket 18 of the cell phone 20. A pair of wires 34 and 36 connect the socket 18 to an amplifier 38. The amplifier 38 amplifies the waveform received from the card reader device 10. The amplified waveform is provided to an analog to digital converter device (ADC) 40 where the waveform in analog form is converted into digital samples of the analog waveform. The digital samples are sent to a microprocessor 42 for further processing, as will be explained. For the sake of clarity and brevity most of the components of the cell phone 20 have not been shown. However, the cell phone 20 may also include such components as memory including flash ROM, SRAM, a camera, a battery, LCD driver, a display, an antenna, a speaker, a Bluetooth circuit, and WiFi circuitry. The flash ROM may contain programs, applications, and/or an operating system for the cell phone 20.

The card reader device 10 is capable of being connected to the cell phone 20 for providing data stored in the magnetic stripe 32 of a card 30. Once connected any magnetic stripe 32 that is swiped in the slot 14 is read by the read head 22. The magnetic read head 22 generates an analog waveform that results from changes in magnetization along the stripe 32 relative to the movement between the read head 22 and the stripe 32. The resistor 26 sets the amplitude of this signal and this signal is provided to the cell phone 20. The resistor 26 is required to control the amplitude of the signal because without the resistor 26 the signal being sent to the cell phone 20 may not be within an acceptable amplitude for the hardware associated with the cell phone 20. If the resistor 26 is missing the signal being sent to the cell phone 20 would be processed incorrectly by the cell phone 20. This signal is then amplified by the amplifier 38 contained in the cell phone 20. The ADC 40 of the cell phone 20 samples the amplified analog waveform at a given sampling rate and generates a stream of digital values or samples. These digital samples are processed by the processor 42 that can in turn provide information to a host system such as a third party or a company that handles credit authentication requests. The processor 42 can communicate with the host system via the cell phone network, WiFi, Bluetooth or any other mode available to it. The host system may also send a signal to the cell phone 20 to indicate that the transaction has been completed. The processor 42 may be controlled by a program or an application stored in memory or in a program storage area. The program or application can be programmed to decode digital samples received from the ADC 40 and use the decoded signals to contact a third party for authorizing a transaction. In this manner, a payment from the card holder's account can be transferred to the cell phone owner's account or allow the cell phone owner to transfer payment to a merchant that accepts credit card transactions.

Figure 3:
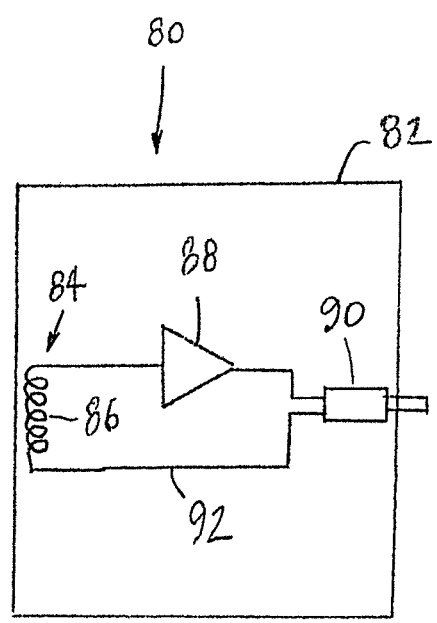
FIG. 3 is a schematic diagram of another embodiment of a card reader device constructed according to the present disclosure.

With reference now to FIG. 3, another embodiment of a card reader device 80 is illustrated. The card reader device 80 comprises a housing 82 having an inductive read head 84 with coil 86 connected to an amplifier 88 which is connected to an output jack 90. The output jack 90 extends out of the housing 82 and is adapted to be inserted into a line in audio input or a stereo line in input associated with a cell phone or other device such as an iPod Touch (not shown). A wire 92 connects the jack 90 to the coil 86. Although not shown in this particular drawing, a slot is formed in the housing 82 near the coil 86 to allow a card having a magnetic stripe to be passed by the coil 86. Data or information stored in the magnetic stripe is read by the coil 86. The coil 86 produces a waveform indicative of data stored in the magnetic stripe and this waveform is provided to the amplifier 88. The amplified waveform is then transmitted to the cell phone via the jack 90. The amplified waveform may be provided to an ADC device for converting into digital samples to be processed by a microprocessor in the cell phone. Once processed, the cell phone may contact a third party for processing a transaction in either direction (i.e., to or from the cell phone owner's account).

Since the card reader device 80 uses the line in audio input of the cell phone, the card reader device 80 is capable of transmitting two tracks from the card being read. As has been previously discussed, a magnetic stripe may have up to three tracks with each of the tracks containing data. For example, the card reader device 80 may read tracks one and two and send these signals to the cell phone as the left and right channels of a stereo signal. However, with the card reader device 80 any two of the three tracks, usually tracks one and two, may be read and decoded when the card reader device 80 is connected to the stereo line in inputs. In some situations or constructions, it is possible that the amplifier 88 may need to be powered. The amplifier 88 may be powered from a power source resident in the cell phone to which the device 80 is connected.

Figure 4:
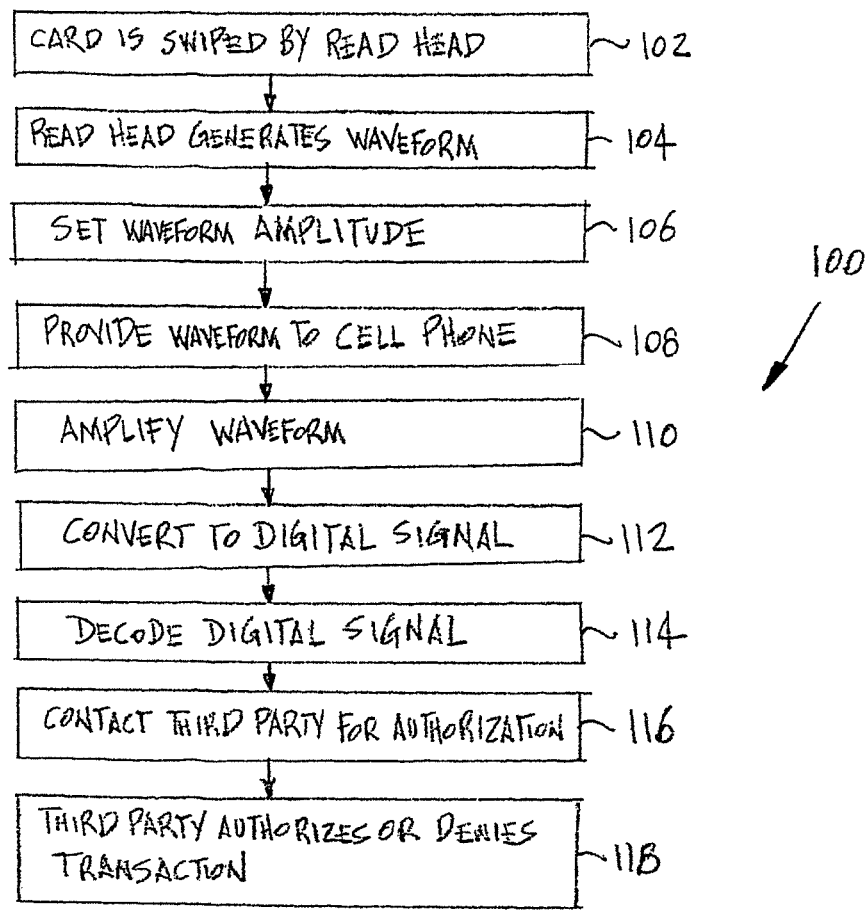
FIG. 4 is a flowchart of a method of operation of a card reader device constructed according to the present disclosure.

FIG. 4 illustrates a flowchart diagram of a method of operation 100 of the card reader device 10. The method 100 begins operation at a step 102 in which a magnetic stripe card 30 is swiped through the slot 14. In a next step 104, the read head 22 reads data stored in the magnetic stripe 32 and generates an analog signal or waveform indicative of data stored in the magnetic stripe 32. The waveform then has its amplitude set by the resistor 26 in a step 106. Next, in a step 108, the set waveform is provided to the cell phone 20 via the output jack 16 through the socket 18. In a next step 110, the amplifier 38 amplifies the set waveform. The waveform is provided to the analog to digital converter device 40 for conversion to a digital signal in a step 112. An application or a program in the cell phone 20 decodes the digital signal in a next step 114. In a next step 116, the program contacts a third party to authorize a transaction using the decoded signal. The third party either authorizes or denies the transaction in a last step 118. For example, if the third party authorizes the transaction then money deducted from the account of the cardholder is transferred into an account associated with the cell phone owner or vice versa. In this way, a debt can be collected or paid by use of the card reader device 10. Further, the card reader devices 10 or 80 may be employed to transact a one-way transaction in which money can be credited to an account. In essence, the card reader devices 10 or 80 allow a user to become either a micro-merchant (payee) or a customer (payer) without having to purchase expensive card reader devices or software.

Figure 5:
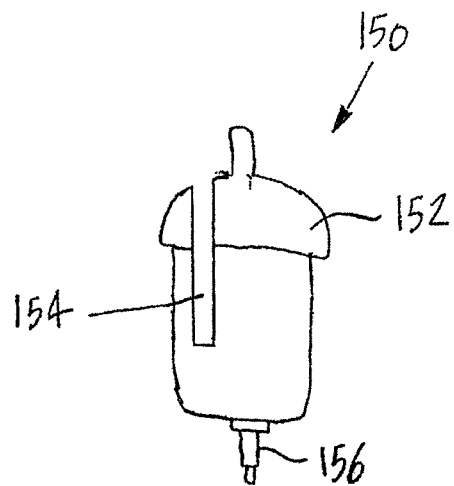
FIG. 5 is a perspective view of a card reader device constructed according to the present disclosure.

With particular reference now to FIG. 5, another embodiment of a card reader device 150 is shown. The card reader device 150 has a housing 152 that is in the shape of an acorn. The device 150 has a slot 154 that runs along a length or a width of the housing 152. The slot 154 has a depth that is deep enough to allow a magnetic stripe of a card to pass through the slot 154. The slot 154 has a length that can be less than the length of a card to be read. The device also has a jack 156 extending out of the housing 152. The device 150 may contain the components shown in either FIG. 2 or FIG. 3. In particular, the device 150 may be easily carried and connected to a cell phone when needed. The device 150 is also small enough that it may be easily stored when not in use. Other shapes, sizes, or designs for the card reader devices 10, 80, or 150 are possible and contemplated.

Figure 6:
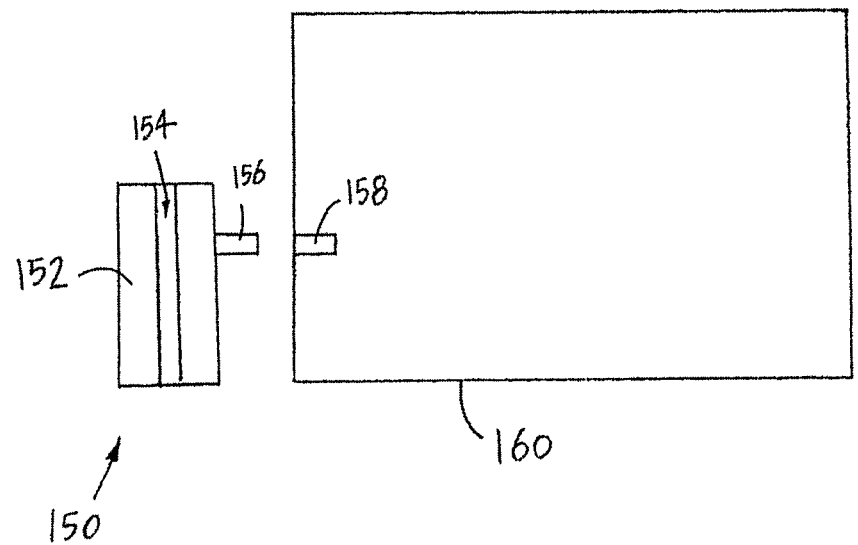
FIG. 6 is a side perspective view of another embodiment of a card reader device constructed according to the present disclosure.

With particular reference now to FIG. 6, number 150 identifies another preferred embodiment of a card reader device constructed according to the present disclosure. The card reader device 150 is shown to comprise a housing 152 having a slot 154 and an output jack 156 extending out from the housing 152. The jack 156 is adapted to be inserted into a socket 158 such as an external microphone input of a host device 160 that can connect to the Internet or can store data and provide data to a device that can connect to the Internet. Some examples of the host device 160 may include an iPod touch, a personal digital assistant (PDA), or a device that has WiFi connectivity. By further way of example, some cell phones have WiFi connectivity but the owner of the phone does not subscribe to a data plan to connect to the Internet so the only way to connect to the Internet is through WiFi. The jack 156 may be a TRS (tip, ring, sleeve) connector also known as an audio jack, phone plug, jack plug, stereo plug, mini-jack, or mini-stereo audio connector. The jack 156 may be formed of different sizes such as miniaturized versions that are 3.5 mm or 2.5 mm. It is also possible and contemplated that the jack 156 may be retractable within the housing 152.

The slot 154 is wide enough and deep enough to accept a card having a magnetic stripe. In particular, the slot 154 is deep enough that the magnetic stripe will fit within the slot 154. The slot 154 also has a length that is less than the length of the card to be inserted into the slot 154. However, it is also possible and contemplated that the slot 154 may have other lengths if desired, for a given application. The housing 152 may take on different shapes and sizes, as has been previously discussed herein.

Figure 7:
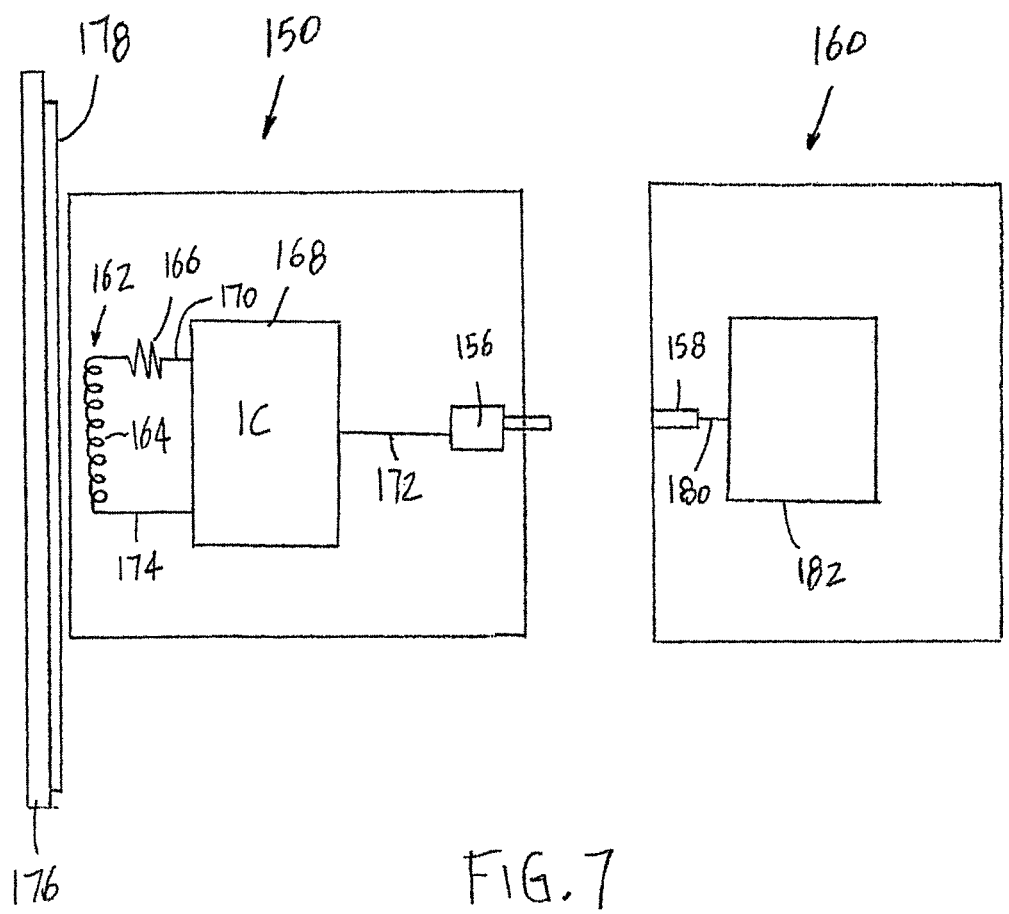
FIG. 7 is a schematic diagram of the card reader device shown in FIG. 6.

FIG. 7 illustrates a schematic diagram of the card reader device 150. The card reader device 150 comprises a read head 162, such as an inductive pickup head, having a coil 164 connected to a signal amplitude setting device 166 such as a resistor which is connected to an integrated circuit (IC) 168. The IC 168 may be, way of example only, a microcontroller such as a Texas Instruments MSP430, a microprocessor, an ASSP (application specific standard products) chip, or an ASIC (application specific integrated circuit) chip, and the IC 168 is connected to the amplitude setting device 166 and connected to the read head 162 (e.g., coil 164) via a lead 170. Although not shown, the IC 168 may be powered by a battery or as will be explained in further detail herein by another connection to the host device 160. The resistor 166 or other circuitry for setting the amplitude is required to control the amplitude of the signal because without the resistor 166 the signal being sent to the IC 168 may not be within an acceptable amplitude for the IC 168. It is also possible that the signal amplitude setting device 166 may be incorporated within the IC 168. The IC 168 is connected to the jack 156 by a lead 172. A lead 174 connects the IC 168 to the read head 162 (e.g., coil 164). A card 176, such as a credit card, has a magnetic stripe 178 associated with the card 176. As has been previously discussed, the magnetic stripe 178 may have three tracks with each of the tracks containing data. The card reader device 150 is capable of reading one track of the possible three tracks when the device 150 is connected to the microphone input 158 of the host device 160. As the magnetic stripe 178 of the card 176 is passed by the read head 162 the read head 162 reads data or information stored in the magnetic stripe 178.

Although not shown, the card 176 is inserted into the slot 154 in the housing 152 and the card 176 is swiped or passed by the read head 162. Data stored in the magnetic stripe 178 may be in the form of magnetic transitions as described in the ISO 7811 standards. As the card 176 moves past the read head 162, magnetic transitions representing data induce a voltage in the coil 164. A voltage signal or waveform produced by the coil 164 is provided to the resistor 166 with the resistor 166 setting the amplitude of the waveform. This waveform is provided to the IC 168 for amplification, signal acquisition, and/or processing. The waveform is provided from the IC 168 to the host device 160 via the jack 156 into the microphone input socket 158. It is also possible that the IC 168 can decode the waveform and determine the account number of the card 176. Further, it is known that there exists an intrinsic remnant magnetization pattern in the magnetic stripe 178 that comprises a fingerprint that is unique to the card 176. If desired the IC 168 can be programmed to sense and collect this fingerprint and send this information to the host device 160 for further authentication of the card 176. A lead 180 connects the socket 158 to circuitry 182 within the host device 160. The circuitry 182 may include various devices such as an amplifier, an ADC, an DAC (digital to analog converter), and a microprocessor, all of which are not illustrated in this figure. The circuitry 182 may also include circuitry and/or algorithms to process waveforms provided from the reader 150 so as to verify account information and to complete a transaction, as has been previously discussed. As can be appreciated, there may be other components associated with the host device 160, as has been discussed in connection with the cell phone 20. However, such components have not been shown in any detail.

The card reader device 150 is capable of being connected to the host device 160 for providing data stored in the magnetic stripe 178 of the card 176. Once connected any magnetic stripe 178 that is swiped in the slot 154 is read by the read head 162. The magnetic read head 162 generates an analog waveform that results from changes in magnetization along the stripe 178 relative to the movement between the read head 162 and the stripe 178. The resistor 166 sets the amplitude of this signal and this signal is provided to the IC 168. As indicated previously, it is possible that the IC 168 could include or incorporate the amplitude setting device 166. The IC 168 can process the signal as either a digital signal or an analog signal which is then provided to the host device 160. The host device 160 can provide information to a host system such as a third party or a company that handles credit authentication requests. The host device 160 can communicate with the host system via WiFi, Bluetooth, or any other mode available to it. The host system may also send a signal, an e-mail, or a message to the host device 160 to indicate that the transaction has been completed.

Figure 8:
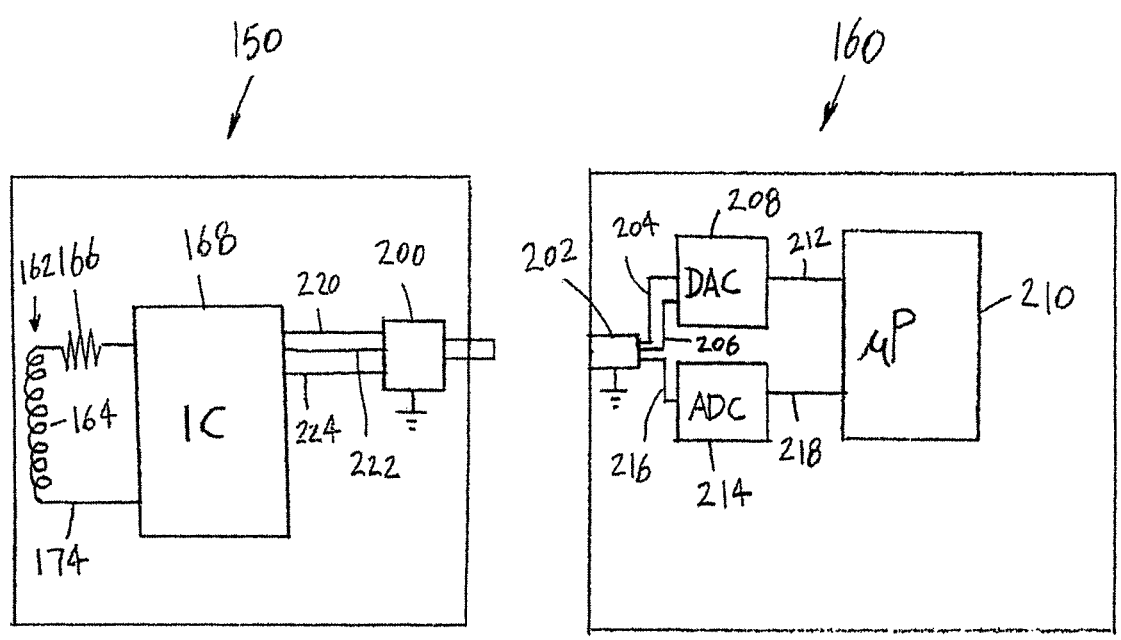
FIG. 8 is a further detailed schematic diagram of the card reader device shown in FIG. 6.

FIG. 8 illustrates the reader 150 being powered by the host device 160. In particular, the reader 150 has a plug 200 that is adapted to be connected to a headphone jack 202 associated with the host device 160. The headphone jack 202 has at least one audio output channel and as most commonly found a left audio out channel 204 and a right audio out channel 206. The audio out channels 204 and 206 are connected to a DAC 208. The DAC 208 is connected to a microprocessor 210 via a connection 212. Although one DAC 208 is shown it is possible to have more than one DAC. The headphone jack 202 is connected to an ADC 214 via a microphone input channel 216 and the ADC 214 is connected to the microprocessor 210 by a connection 218. As has been previously discussed, the plug 200 may be an audio jack, phone plug, jack plug, stereo plug, mini-jack, or mini-stereo audio connector.

The plug 200 is connected to the IC 168 via a left channel 220, a right channel 222, and a microphone input 224. The IC 168 is provided power from the host device 160 in the following manner. One of the audio out channels (204 or 206) can be programmed to output a waveform that is readily rectified and low pass filtered to provide power to the IC 168. If the audio output of the host device 160 is DC (direct current) coupled, the audio out channel (204 or 206) can be programmed to a DC level for use as power to the IC 168. Also, if stereo audio outputs are available the left audio out channel 204 and the right audio out channel 206 can be combined to double the power to the reader device 150.

The IC 168 may have a digital interface to the host device 160 by using the left and right audio out channels 204 and 206 and the microphone input channel 216 of the host device 160. The host device 160 can provide a data transfer clock and a serial data stream to the IC 168 from the DAC 208 in the host device 160 while receiving synchronous data from the IC 168 via the microphone input 216. The data transfer clock could be rectified and filtered to provide power to the IC 168 as well. An alternative method of transferring digital data from the IC 168 to the host device 160 is to modulate a carrier waveform with the digital data and deliver the modulated waveform to the microphone input 216 in either a synchronous (using an audio output for synchronization) or asynchronous manner. Examples of modulation formats are OOK, ASK, FSK, PSK, QPSK, MSK, or the like. Demodulation of the serial digital data can be accomplished by the microprocessor 210 in the host device 160 under program control.

From all that has been said, it will be clear that there has thus been shown and described herein a card reader device which fulfills the various advantages sought therefore. It will become apparent to those skilled in the art, however, that many changes, modifications, variations, and other uses and applications of the subject card reader device are possible and contemplated. All changes, modifications, variations, and other uses and applications which do not depart from the spirit and scope of the disclosure are deemed to be covered by the disclosure, which is limited only by the claims which follow.

What is claimed is:

1. A card reader device, comprising:
   a housing including a slot;
   a read head enclosed within said housing and positioned in relation to the slot so that the read head generates an analog, non-digitized output signal indicative of data stored on a magnetic stripe of a card when passed by the read head by swiping the card in the slot;
   an integrated circuit enclosed within the housing that receives the read head output signal and that decodes the read head output signal including an account number, and that generates a decoded output signal that is a modulated signal conveying information including the account number; and
   a standard stereo plug extending from the housing and adapted to be inserted into a standard headset jack of a mobile host device having a microphone input, said standard stereo plug being adapted to communicate the decoded output signal to the microphone input of the mobile host device into which the standard stereo plug is inserted;
   wherein the card reader device provides all electrical connections with the mobile host device via the standard stereo plug.

2. The card reader device of claim 1, including a battery to provide power to the integrated circuit; and wherein the housing encloses the battery.

3. The card reader device of claim 1, wherein the integrated circuit is coupled to the standard stereo plug to receive power from the mobile host device via the standard headset jack of the mobile host device.

4. A method, comprising:
   generating, by a read head of a card reader device in response to a magnetic stripe of a card being swiped in a slot of a housing of the card reader device causing the magnetic stripe to be passed by the read head, an analog, non-digitized read head output signal indicative of data stored on the magnetic stripe;

decoding, by an integrated circuit enclosed within said housing, the read head output signal to produce decoded magnetic stripe data including an account number;

generating, by the integrated circuit, a decoded output signal that is a modulated signal conveying information about the magnetic strip data, including the account number, and communicating the decoded output signal to a mobile host device; and providing the decoded output signal to a microphone input of a standard headset jack of said mobile host device, said reader having a standard stereo plug extending from the housing and adapted to be inserted into the headset jack of the mobile host device; and wherein the card reader device provides all electrical connections with the mobile host device via the standard stereo plug.

5. The method of claim 4, comprising receiving power for operating the card reader device, including powering the integrated circuit, from the mobile host device through the standard stereo plug.

6. The method of claim 5, wherein said step of receiving power for operating the card reader device from the mobile host device includes rectifying one or more audio output waveforms produced by the mobile host device and received by the card reader device through the standard stereo plug.

7. The card reader device of claim 3, wherein one or more audio output waveforms produced by the mobile host device and received via the standard stereo plug are rectified to provide power to the integrated circuit.

8. The card reader device of claim 7, including circuitry reducing the amplitude of the output signal to be said communicated to the microphone input.

9. The card reader device of claim 8, wherein said circuitry reducing the amplitude of the output signal operates by only passive attenuation.

10. The card reader device of claim 3, wherein the integrated circuit is powered by rectifying one or more audio output signals received from the mobile host device via the standard stereo plug, with each of said one or more audio output signals being a waveform that is received to provide power to the card reader device, and with each of said one or more audio output signals being a waveform produced by audio output circuitry of the mobile host device.

11. The card reader device of claim 10, including circuitry reducing the amplitude of the output signal to be said communicated to the microphone input.

12. The card reader device of claim 11, wherein said circuitry reducing the amplitude of the output signal operates by only passive attenuation.

13. The card reader device of claim 3, including circuitry reducing the amplitude of the output signal to be said communicated to the microphone input.

14. The card reader device of claim 13, wherein said circuitry reducing the amplitude of the output signal operates by only passive attenuation.

15. The card reader device of claim 1, including circuitry reducing the amplitude of the output signal to be said communicated to the microphone input.

16. The card reader device of claim 15, wherein said circuitry reducing the amplitude of the output signal operates by only passive attenuation.

17. The card reader device of claim 1, wherein the output signal is said communicated to the microphone input in an asynchronous manner.

18. The card reader device of claim 17, wherein the output signal is a frequency-shift keyed (FSK) signal.

19. The card reader device of claim 18, including circuitry reducing the amplitude of the output signal to be said communicated to the microphone input.

20. The card reader device of claim 19, wherein said circuitry reducing the amplitude of the output signal operates by only passive attenuation.

21. The method of claim 6, including reducing the amplitude of the output signal after said generating of the output signal and before providing the output signal to the microphone input.

22. The method of claim 21, wherein said reducing the amplitude of the output signal is performed by using only passive attenuation.

23. The method of claim 4, comprising powering the integrated circuit by a battery enclosed within the housing of the card reader device.

24. The method of claim 4, wherein the output signal is said provided to the microphone input in an asynchronous manner.

25. The method of claim 24, wherein the output signal is a frequency-shift keyed (FSK) signal.

26. The method of claim 25, including reducing the amplitude of the output signal after said generating of the output signal and before providing the output signal to the microphone input.

27. The method of claim 26, wherein said reducing the amplitude of the output signal is performed by using only passive attenuation.

* * * * *